Jan. 26, 1965  E. C. LEMMOND  3,166,785
AUTOMATIC POULTRY DROP SHACKLE
Filed Oct. 17, 1962
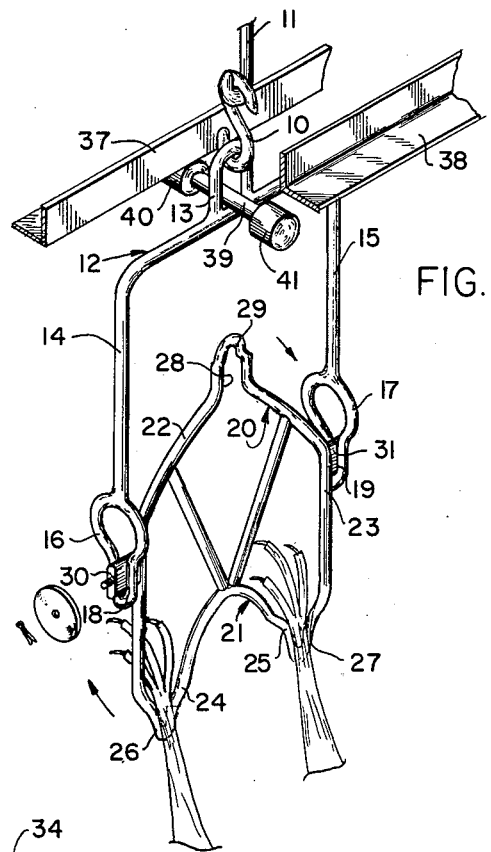
FIG. 1
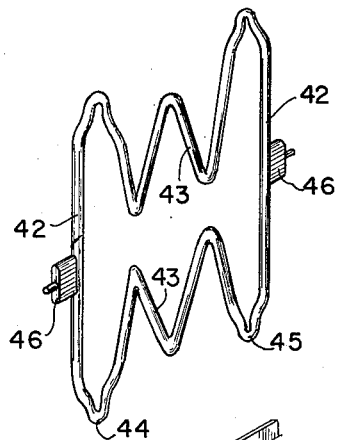
FIG. 3
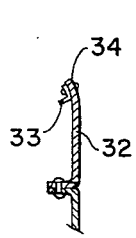
FIG. 2
FIG. 4
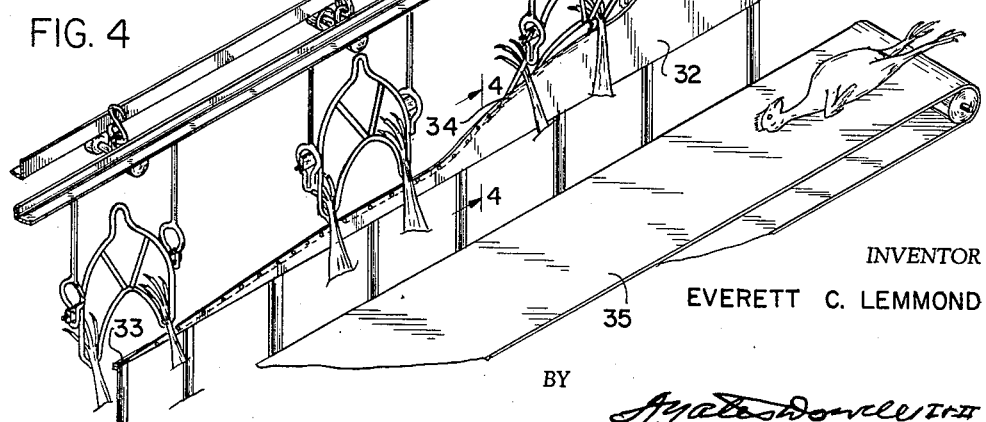
INVENTOR
EVERETT C. LEMMOND
BY
*A. Yates Dowell III*
ATTORNEYS United States Patent Office 3,166,785
Patented Jan. 26, 1965

3,166,785
AUTOMATIC POULTRY DROP SHACKLE
Everett C. Lemmond, Rte. 3, Somerville, Ala.
Filed Oct. 17, 1962, Ser. No. 231,241
3 Claims. (Cl. 17—44.1)

This invention relates to the preparation of poultry for human consumption, including the dressing turning of the same to facilitate such dressing, and relates also to conveying systems and apparatus by which the poultry is handled during the various steps of the procedure.

The invention relates particularly to a poultry hanger or suspension device frequently referred to as a shackle, and by which the birds may be suspended either by the feet or by the neck, and which device permits the poultry to be turned to assist in or facilitate the dressing of the same.

Prior shackles have required excessive labor in the turning and discharging of the poultry and frequently they have caused damage to the flexible fingers of mechanical pickers.

It is an object of the invention to provide a shackle and means in conjunction therewith for operating the same whereby less labor will be required in the turning and releasing or dropping of the poultry, and less damage will be caused to the mechanical picker mechanism including the flexible fingers thereof.

Other objects and advantages of the invention will be apparent from the following description taken in conjunction with the accompanying drawing wherein:

FIG. 1 is a perspective of the invention;

FIG. 2, a perspective of the system with the shackle turning portions;

FIG. 3, a perspective of a modified shackle; and

FIG. 4, a section taken on line 4—4 of FIG. 2.

Briefly stated the invention is a two-part poultry shackle, the upper frame or part being generally U-shaped with an intermediate loop by which it may be suspended on a conveyor, such shackle having at each end a ring with a reduced lower portion providing a slot in which relatively flat supports carried at opposite sides of the lower frame or part in such rings may be releasably retained, such lower frame or part being formed of a pair of generally U-shaped members having their extremities joined to provide receiving areas in which the feet of the poultry can be disposed and with the intermediate portion of the outer frame provided with a neck receiving restriction and a brace extending from the larger frame adjacent each side of the neck receiving portion to an intermediate portion of the lower frame to provide stiffness and strength. Thus when the side members which support the lower frame are elevated the lower frame can be rotated to reverse its ends, and in order to produce such elevation automatically operating mechanism is supplied in the form of an inclined surface such as that of a ramp or conveyor which causes release of the poultry from the shackle.

With continued reference to the drawing the present invention is adapted to be supported by hooks 10 from a conveyor 11 and it comprises a generally U-shaped member 12 the extent of which is attached a supporting loop 13 in which the U-shaped hook 10 is adaptedly engaged.

The sides or legs 14 and 15 of the U-shaped member are provided with rings or loops 16 and 17 having slots or reduced portions 18 and 19.

Mounted within the generally U-shaped member 12 is an attaching member comprising a pair of U-shaped members 20 and 21, the upper larger U-shaped member having legs 22 and 23 and the smaller U-shaped member having legs 24 and 25 with the legs 22 and 24 connected and forming a reduced extension 26 and the legs 23 and 25 connected and forming a reduced extension 27.

The lower portions of the adjacent legs 22 and 24, and 23 and 25 are spaced to receive therebetween the legs of poultry adjacent the feet to support the poultry with heads down to facilitate discharge of blood. The central portion of the U-shaped member 20 is provided with a narrow portion 28 and a reduced extension 29, the narrow portion 28 being of a size when in a depending position opposite that illustrated in FIG. 1 to receive and suspend a fowl by its neck.

It will be apparent from the foregoing that there is provided a suspension member and a poultry-carrying member capable of being disposed in two positions. Relative to the first the supporting member 20 is provided with a pair of lateral locking supports 30 and 31 welded or otherwise fixed to the member 20, the member 30 being of a thickness to be non-rotatably held within the narrow portions 18 and 19 of the loops or rings 16 and 17. Thus when the lower frame member is supporting the weight of the poultry it will be non-rotatably suspended but by elevating the same it may be rotated to discharge its load.

In order to automatically release the poultry from the lower frame member, a plate 32 is provided below the conveyor 11 and a ramp 33 is attached to the upper edge of such plate along a substantial portion of its length. The cam plate 32 engages the legs of the poultry adjacent to the lower frame member in such a manner that the reduced extensions 26 and 27 engage the ramp 33. As the device is moved along by the conveyor 11, the lower member will be raised relative to the upper member by the ramp 33 until the locking supports 30 and 31 are lifted out of the reduced portions 18 and 19 and into the loops 16 and 17. At this point the cam plate is provided with an outwardly curved upper portion 34 which causes the lower member to rotate slightly to a position where the locking supports 30 and 31 are no longer in alignment with the reduced portions 18 and 19. The cam plate then increases in height and continues to rotate the lower member while simultaneously forcing the legs of the poultry out of the reduced extensions 26 and 27 until such time as the legs are released and the poultry falls by gravity. An endless belt type of conveyor 35 is disposed below the conveyor 11 to catch the poultry which has been released. This operation will be automatic and will not require the attention of a workman.

As illustrated in FIG. 3, a modified form of the lower member is provided so as to be reversible. In this modification the lower member includes a pair of generally parallel side members 42 connected at their opposite ends by W-shaped members 43. The connections of the members 42 and 43 form reduced extremities 44 and 45 at each end of the lower member similar to the extremities 26 and 27 to accommodate the feet of the poultry. The central portion of the W-shaped members are adapted to suspend a fowl by its neck in a manner similar to the reduced extension 29. In the use of this device, either end of the lower member is capable of supporting the fowl by either its feet or its neck. The side members 42 are each provided with outwardly extending locking supports 46 which engage the supporting loop 13 in the same manner as the supports 30 and 31 previously described.

In order to prevent the suspending frame 12 from moving upwardly while the lower frame is elevated a pair of fixed bars 37 and 38 are provided, and a shaft 39 is attached to the upper frame and is provided with rollers 40 and 41 which pass under the bars 37 and 38 as the tips 26, 27 or 29 ride upon the ramp 33.

It will be apparent from the foregoing that a relatively simple, low-cost, practical structure is provided which will effect considerable saving of labor, which is easy to operate and turn the fowl it being only necessary to pick

What is claimed is:

1. A poultry shackle comprising a frame of substantially U-shaped construction and a second smaller contained frame of generally similar construction, said frames being connected and having a reduced extension at each end thereof, means for raising the intermediate portions of the U-shaped frames, the intermediate portion of the larger of said U-shaped members intermediate the top and ceive the neck of a fowl, laterally extending supporting and locking portions carried on the remote sides of the larger of said Ushaped members intermediate the top and bottom of the same, a supporting yoke having a central upper portion for suspension from a conveyor and having a lower portion of a configuration to receive the supporting portions of the first frame, said supporting portions having flat portions and the side portions of the second frame having complementary portions in which said flat portions may be received and held against rotation and with an adjacent larger area in which said flat portions can move up to be rotatable.

2. In a poultry processing plant a two-part poultry shackle including a hanger and a reversible poultry holder, a conveyor on which said shackle is adapted to be suspended, and an inclined surface mechanism with which said holder of said shackle is adapted to contact to be elevated thereby for reversal to release the poultry.

3. A poultry shackle comprising a pair of frames, one a main frame and the other a reversible auxiliary frame, the main frame being adapted to be mounted on a conveyor and the auxiliary frame being carried by the main frame, said auxiliary frame having two arched members, the second extending into the first, and with the free ends of the first and second joined to provide a pair of slots for the receipt of the legs of poultry, and the first having a central oppositely located yoke receiving the neck of poultry, means whereby the two-part auxiliary frame may be secured in fixed relation and subsequently released, said means including a pair of arms receivable in a pair of openings with depending reduced slots and said arms being flat to fit within and be held against rotation within said slots, release from the fixed relation being accomplished by the relative movement of said main and auxiliary frames.

4. A poultry shackle for the individual suspension of poultry upon a conveyor, said shackle comprising upper and lower parts, the upper part having spaced arms with free end portions, each with a receiving opening adjacent its extremities, the lower part comprising a pair of generally curved members with the curves extending in the same general direction and with pairs of extremities joined in a manner to provide a pair of slots for the reception of a poultry foot between each pair of joined ends of said members, and a poultry neck receiving yoke upon the member in remote relation to the slots, diverging braces having ends mounted in relatively close relation on the mid portion of one of said members and their other ends further apart and connected to the other member at the opposite sides of said yoke, oppositely disposed mounting projections on said lower part adapted to be received in said receiving openings, the remote portion of said receiving openings and said oppositely disposed mounting projections being complementary in size whereby the parts can be locked in fixed relation and by relative movement can be unlocked and one reversed relative to the other to cause release of poultry from said slots and yoke.

5. The structure of claim 4 in which relative movement may be produced between the upper and lower parts automatically to release a fowl carried by said shackle.

6. The structure of claim 4 in which the poultry shackle has oppositely disposed poultry receiving portions which open upwardly when such portions are depending and with opposed mounting portions for said lower portions.

7. A two-part poultry shackle, one part being of a construction to receive and support a fowl and the other being adapted to support the first and with cooperative means therebetween whereby they may be locked in fixed relation but can be unlocked by a movement of one of the members relative to the other to release the poultry.

8. The combination in a poultry processing plant of a conveyor for poultry to be processed, a two part shackle, a first part providing a hanger having loop means at one end, a second part having a portion for insertion in said loop means, said second part having a portion for receiving feet of poultry in one position and an opposed portion when reversed for engaging the neck of poultry, means formed by said loop for providing a locking relation between the two parts of the shackle, and means for causing disengagement of the parts to reverse the hanger to cause automatic dropping of the poultry.

References Cited by the Examiner
UNITED STATES PATENTS

| | | | |
|---|---|---|---|
| 2,819,489 | 1/58 | Shadley | 17—44.1 |
| 3,042,186 | 7/62 | Varney | 198—185 |
| 3,044,109 | 7/62 | Wayne | 17—44.1 |

SAMUEL F. COLEMAN, *Primary Examiner.*

WILLIAM B. LA BORDE, ERNEST A. FALLER, JR.,
*Examiners.*